US012736813B2

(12) United States Patent
Morrison et al.

(10) Patent No.: US 12,736,813 B2
(45) Date of Patent: Sep. 15, 2026

(54) SYSTEMS AND METHODS FOR REDUCING STRAY LIGHT IN AUGMENTED REALITY AND RELATED APPLICATIONS

(71) Applicant: NewSight Reality, Inc., Ponte Vedra, FL (US)

(72) Inventors: Rick Morrison, Longmont, CO (US); Ronald Blum, Atlanta, GA (US)

(73) Assignee: NewSight Reality, Inc., Ponte Vedra, FL (US)

( * ) Notice: Subject to any disclaimer, the term of this patent is extended or adjusted under 35 U.S.C. 154(b) by 233 days.

(21) Appl. No.: 18/766,321

(22) Filed: Jul. 8, 2024

(65) Prior Publication Data

US 2024/0361597 A1 Oct. 31, 2024

Related U.S. Application Data

(63) Continuation of application No. 17/827,665, filed on May 28, 2022, now Pat. No. 12,032,161, which is a (Continued)

(51) Int. Cl.
*G02B 27/00* (2006.01)
*G02B 3/00* (2006.01)
*G02B 27/01* (2006.01)

(52) U.S. Cl.
CPC ....... *G02B 27/0149* (2013.01); *G02B 3/0006* (2013.01); *G02B 3/0056* (2013.01);

(Continued)

(58) Field of Classification Search
CPC ......................... G02B 27/0149; G02B 3/0006; G02B 3/0056; G02B 27/0172; G02B 2027/015; G02B 2027/0178; G02B 2027/0187; G02B 5/003; G02B 27/0018; G02B 2027/0118; G02B 2027/0138; G02B 27/0176; G02B 27/01; G02B 27/0101; G02B 27/0103; G02B 27/017; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0141; G02B 2027/014; G02B 2027/0143; G02B 2027/0145; G02B 2027/0147; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183;

(Continued)

(56) References Cited

U.S. PATENT DOCUMENTS

2016/0313558 A1* 10/2016 Gutierrez ............... G06F 3/013

* cited by examiner

*Primary Examiner* — Henry Duong
(74) *Attorney, Agent, or Firm* — Woods Rogers Vandeventer Black PLC; Nathan A. Evans

(57) ABSTRACT

Systems and apparatus for managing stray light in augmented reality, mixed reality, enhanced reality, and similar applications.

7 Claims, 16 Drawing Sheets

Related U.S. Application Data continuation-in-part of application No. 16/855,964, filed on Apr. 22, 2020, now Pat. No. 12,055,715, which is a continuation of application No. 16/289,623, filed on Feb. 28, 2019, now Pat. No. 10,634,912, which is a continuation-in-part of application No. 16/008,707, filed on Jun. 14, 2018, now Pat. No. 10,466,487, which is a continuation-in-part of application No. 15/994,595, filed on May 31, 2018, now Pat. No. 10,884,246.

(60) Provisional application No. 62/848,636, filed on May 16, 2019, provisional application No. 62/847,427, filed on May 14, 2019, provisional application No. 62/796,388, filed on Jan. 24, 2019, provisional application No. 62/796,410, filed on Jan. 24, 2019, provisional application No. 62/794,779, filed on Jan. 21, 2019, provisional application No. 62/793,166, filed on Jan. 16, 2019, provisional application No. 62/790,514, filed on Jan. 10, 2019, provisional application No. 62/790,516, filed on Jan. 10, 2019, provisional application No. 62/788,993, filed on Jan. 7, 2019, provisional application No. 62/788,995, filed on Jan. 7, 2019, provisional application No. 62/788,275, filed on Jan. 4, 2019, provisional application No. 62/787,834, filed on Jan. 3, 2019, provisional application No. 62/785,284, filed on Dec. 27, 2018, provisional application No. 62/783,603, filed on Dec. 21, 2018, provisional application No. 62/783,596, filed on Dec. 21, 2018, provisional application No. 62/780,396, filed on Dec. 17, 2018, provisional application No. 62/780,391, filed on Dec. 17, 2018, provisional application No. 62/778,960, filed on Dec. 13, 2018, provisional application No. 62/778,972, filed on Dec. 13, 2018, provisional application No. 62/775,945, filed on Dec. 6, 2018, provisional application No. 62/774,362, filed on Dec. 3, 2018, provisional application No. 62/771,204, filed on Nov. 26, 2018, provisional application No. 62/770,210, filed on Nov. 21, 2018, provisional application No. 62/769,883, filed on Nov. 20, 2018, provisional application No. 62/756,542, filed on Nov. 6, 2018, provisional application No. 62/756,528, filed on Nov. 6, 2018, provisional application No. 62/755,626, filed on Nov. 5, 2018, provisional application No. 62/755,630, filed on Nov. 5, 2018, provisional application No. 62/754,929, filed on Nov. 2, 2018, provisional application No. 62/753,583, filed on Oct. 31, 2018, provisional application No. 62/752,739, filed on Oct. 30, 2018, provisional application No. 62/739,907, filed on Oct. 2, 2018, provisional application No. 62/739,904, filed on Oct. 2, 2018, provisional application No. 62/732,138, filed on Sep. 17, 2018, provisional application No. 62/732,039, filed on Sep. 17, 2018, provisional application No. 62/728,251, filed on Sep. 7, 2018, provisional application No. 62/720,116, filed on Aug. 21, 2018, provisional application No. 62/720,113, filed on Aug. 20, 2018, provisional application No. 62/717,424, filed on Aug. 10, 2018, provisional application No. 62/711,669, filed on Jul. 30, 2018, provisional application No. 62/703,909, filed on Jul. 27, 2018, provisional application No. 62/703,911, filed on Jul. 27, 2018, provisional application No. 62/700,621, filed on Jul. 19, 2018, provisional application No. 62/700,632, filed on Jul. 19, 2018, provisional application No. 62/694,222, filed on Jul. 5, 2018, provisional application No. 62/648,371, filed on Mar. 26, 2018, provisional application No. 62/638,789, filed on Mar. 5, 2018, provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/546,473, filed on Aug. 16, 2017, provisional application No. 62/542,168, filed on Aug. 7, 2017, provisional application No. 62/530,638, filed on Jul. 10, 2017, provisional application No. 62/522,866, filed on Jun. 21, 2017, provisional application No. 62/513,828, filed on Jun. 1, 2017.

(52) U.S. Cl.
CPC .... *G02B 27/0172* (2013.01); *G02B 2027/015* (2013.01); *G02B 2027/0178* (2013.01); *G02B 2027/0187* (2013.01)

(58) Field of Classification Search
CPC ...... G02B 2027/0185; G02B 2027/019; G02B 2027/0192; G02B 2027/0194; G02B 2027/0196; G02B 2027/0198
USPC ........................................................ 359/630
See application file for complete search history.

SYSTEMS AND METHODS FOR REDUCING STRAY LIGHT IN AUGMENTED REALITY AND RELATED APPLICATIONS

CROSS-REFERENCE TO RELATED APPLICATIONS

The present application is a child of and relies on the disclosures of and claims priority to and the benefit of the effective filing dates of U.S. patent application Ser. No. 17/827,665 filed May 28, 2022, and U.S. patent application Ser. No. 16/855,964 filed Apr. 22, 2020. The present application further relies on the disclosures of and claims priority to and the benefit of the filing dates of all other applications to which the above applications rely on the disclosures of and claims priority to and the benefit of. All the above disclosures, applications, and all references cited herein are hereby incorporated by reference herein in their entireties.

BACKGROUND OF THE INVENTION

Field of the Invention

The present invention is directed to methods for managing stray light in augmented reality, mixed reality, enhanced reality, and similar systems as would be understood by one of ordinary skill in the art.

Stray light would be understood by one of skill in the art to be light that does not follow the intended or preferred path through an augmented reality system, such as a Transparent Optical Module ("TOM") system or device, and may produce a glare, ghost images, or background haze that reduces overall contrast of the desired virtual and real world images. In instances in the present application, two light channels that we will describe for this current setup or configuration; the path for real world light, and the path for display emitted light. Stray light typically occurs when light from one channel becomes inadvertently routed into the other channel. Also described herein is light that is lost by not being directed into either channel.

The desired (or intended) real world imaged light, in aspects, includes the real world view formed from light from the external world that passes through the transparent areas of the display substrate and the regions between lenslets on a lens array, such as a microlens array ("MLA"), including a static and a dynamic MLA. This light enters the eye pupil and is focused by the eye's lens to an image on the retina. The display emitted light follows a path from the display element, through the lenslet in the MLA, enters the eye's lens and is focused by the eye lens onto the retina. In aspects, compositions of both retinal images—(a) from the real world and (b) from the display and lenses of the MLA—form one augmented reality image. For purposes of this application, references to and the terms lenslet(s) and microlens(es) can be used interchangeably. In aspects, the microlenses/lenslets can have aperture diameters on the order of 0.2 mm to 0.5 mm, although other sizes are contemplated, such as from 0 mm to 0.1 mm, from 0.1 mm to 0.2 mm, from 0.5 mm to 0.6 mm, from 0.6 mm to 0.7 mm, from 0.7 mm to 0.8 mm, and so on.

In instances herein, several kinds of light-related terms are referred to, such as the following:

Real World Light (RW)—Light arriving from objects in the external world.

Near Eye Display Light (NED) (sometimes referred to herein as Virtual Display Light ("VD"))—Display emitted light. This is called a near eye or virtual display since the display element is too close to be focused directly by the user's eye's lens, therefore lenslets or optics are used to focus the display to appear at a further distance.

The display is a light emitting pixel-based element which is transparent or semitransparent to light from the real world and does not distort or redirect RW light in a manner that meaningfully reduces the perceptual quality of the real world view. Since most current semiconductor-based pixels are not transparent in the visible spectrum, the pixels in one embodiment are grouped into patches with transparent areas located between groups of patches.

The lenslet array, also referred to as the microlens array (MLA), are a set of optics where each lenslet object is designed to project a display element image to the eye. The lenslet optics may include a single convex refractive lens on a transparent substrate in its simplest form. More complex configurations may include multiple optical lenses on multiple surfaces, flat and/or curved substrate surfaces. The configurations may also include Fresnel lenses, diffractive feature lenses, and/or meta-optics. And prismatic features and diffractive features can be used to split the focal power and direct light. Individual lenslets may be circular, square, rectangular, or hexagonal in shape, by way of example. The lenslets may be spaced sparsely so there are transparent regions between them. In instances herein, the term lenslet and/or MLA will be used to indicate various aspects of the optics directing display light to the eye pupil and will not be limited by the label as would be understood by one of ordinary skill in the art. (Herein and as one of ordinary skill in the art would understand, lenslet and mirolenslet will be used interchangeably and will be further apparent from the context in which they are described.)

Intended Imaged Light (IIL) is RW/NED light that is directed to enter the eye's pupil and be imaged onto the retina as intended by the optical system design.

Unintended Imaged/Stray Light (UISL) is light directed to the retina that does not follow the intended path through the system and does not properly contribute to either real world or near eye display images. This might also include light diffracted at element edges or by periodically oriented sets of features.

Lost Light (LL) is light that might normally enter the eye but does not enter the pupil due to absorption, redirection, or misdirection. This can reduce the perception of RW or NED brightness.

In further regards to stray light, real world light that passes through, for example, a lenslet or MLA and is redirected is one possible form of stray light. Another form of stray light is display light that passes through the region between lenslets and is therefore not focused. Also, light from pixels or patches that passes through an adjacent or distant lenslet (and, in cases, misses its intended lenslet) will be focused incorrectly and is considered stray light.

Yet another form of stray light is light reflected unintentionally from surfaces, such as the MLA substrate display-side and eye-side surfaces, or from a display coverwindow or other display transparent surfaces. Light scattered from within, or on the surfaces of materials, and collected by the eye pupil are also forms of stray light.

The nature of both intended light, stray light, and lost light depends not only on the configuration of the optical elements, but also on the placement of the user's eye relative to the augmented reality system (TOM) and the size of the eye pupil. The pupil of the eye can have a diameter of 2 to 4 millimeters when the observer is viewing a bright scene, while the pupil can have a diameter from 4 to 8 millimeters if the observer is viewing a relatively dimly lit scene. If the display and the associated lenslet that directs the light from the display are centered with respect to the eye pupil, then light from most of the pixels are accepted into the eye pupil if the diameter is relatively large. This is shown in, for example, FIG. 5; see display image 5001, perceived image 5002, display element blue 5003 and depicted light beams, display element green 5004 and depicted light beams, and display element red 5005 and depicted light beams. However, if the eye pupil size is smaller 6002 due to a brighter scene as in FIG. 6, then light from pixels toward the edge of the display element may not pass through the eye pupil. This leads to the perceived image being vignetted along the edges 6001.

Stray light from rays originating from the display that miss the lenslet (e.g., travel outside a surface area of the lenslet/microlens) will typically be stronger, more prominent, and/or more dense when the eye pupil is a larger size. The amount of stray light accepted from the display element can depend on the size of the user's eye pupil. The user's eye pupil size typically depends on the average light intensity of the viewed scene. FIGS. 7 and 8 show an example of near eye display 7001 generated stray light acceptance as predicted by an optical modeling application. In FIG. 7, the thicker arrows indicate light rays 7002 emitted from one display pixel or pixel patch 7003, collimated by the lenslet 7004, and then accepted into a large diameter pupil 7005, which will be focused onto the user's retina. The inset image 7006 in FIG. 7 shows the image formed on the retina of a bar chart pattern formed by a display image composed of multiple emitting pixels. There is a large diameter halo surrounding the bar chart image that is due to accepted stray light 7007 directed toward the retina.

FIG. 8 shows a similar optical system that has a smaller eye pupil size 8005. The thicker arrows again represent rays 8002 that are intended to form an image of the display on the retina. The inset picture 8006 shows the modeled performance of the optical system. In this case, the size of the stray light halo surrounding the intended image is smaller. Note that although a smaller diameter pupil has benefits in reducing stray light from entering the pupil 8007, it can also lead to undesired vignetting. So, both effects need to be considered during the design of the current optical system.

The amount of stray light can be influenced by the optical system structure and the location and size of the user's eye pupil.

The following explanations will categorize methods for managing stray into three techniques. First, managing stray light and light loss produced by transparency, scattering, and reflection issues are described. Natural properties of glass usually create these issues, and remedies need to address both RW and NED stray light problems. Second, mechanical shields that block RW and NED light channels from intermixing are described. Third, design features and operation techniques that manage light from intermixing between RW and NED optical channels are described.

DESCRIPTION OF THE RELATED ART

Existing systems, such as cameras, binoculars, eyeglasses and microscopes, use anti-reflection coatings on optical surfaces to reduce the stray light coming from reflections from transparent optical materials in the system. These mechanisms of reducing stray light are sufficient for reducing a portion of the stray light problems in those particular applications, but they are not sufficient for stray light produced where real world light is directed through the lenslets, or for display produced light that does not pass through its intended lenslet, such as in the current application.

Reduced transparency of particular glasses and the display substrate lead to light loss and can be remedied, according to the present invention, by selecting materials that suit both optical and structural specifications of the system. Transparency is also reduced by display elements or lenslet elements obscuring RW light rays. Thus, according to the present invention, the system design can be configured and improved through the choice of display patch size and lenslet size to influence obscuration, and can be balanced for optimal relative throughput of RW and NED light. There is therefore a need to improve the existing state of the art, and these and other improvements to the existing art are described herein.

SUMMARY OF THE INVENTION

In one embodiment of the present invention, a system and method is provided that reduces stray light effects in augmented reality systems and related technology, such as, by way of example, enhanced reality and extended reality.

In general, there are two categories of stray light. First there is light from the display which does not ideally image onto the retina, including light missing and surrounding a lenslet which creates a halo effect, and light scattered/reflected in a coverwindow. Second, there is light from the real world that does not ideally image onto the retina, including light that passes through the lenslet, as well as light that scatters/reflects in a coverwindow and/or MLA substrate.

Techniques and methods to reduce unwanted stray light and lost light are described herein, including:

(1) Optic materials and surfaces:

- (a) Anti-reflection coatings on both coverwindow/display back-plane and/or on the MLA are able to reduce ghost images and light flare from intense RW sources. The AR coatings also improve the relative throughput of intended light.
- (b) Selecting high transparency MLA substrates and display backplane/cover window materials, as well as choosing materials with low amounts of inclusions and imperfections.
- (c) Producing high quality processed, polished material surfaces.

(2) Light shielding and blocking techniques:

Opto-mechanical shields, such as absorbing light pipe(s) between pixels/groupings of pixels/patches and an MLA lenslet or microlenslet. In embodiments, the shields are preferably placed at boundaries between the RW and NED optical channels.

When the hollow shield is larger at the display base than the display patch, then absorbing shields can be placed around the display patch or on the outer (external) surface of the display.

(3) Circular (or other-shaped (e.g., square)) planar shield (s) surrounding lenslets or microlenslets that absorb stray light.

(4) Annular shields that reside on a surface other than the lenslets on the MLA.

Design and operating techniques include:

(5) Using larger size high image quality lenslet designs to capture a larger angular emission from the display.

(6) Light shields on the real world side of the display structure to absorb light emitted in the forward direction that might be viewed by others.

In aspects, any one or more of these techniques can be used together, such as simultaneously.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 1 also shows a pupil of a user/wearer 1003, absorbed real world light 1004 (such as absorbed by light emitters and/or a light blocking element 1005), real world light that goes through a lenslet 1006, microlens array 1007, and lenslet/microlens 1008.

DETAILED DESCRIPTION OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Figure 1:
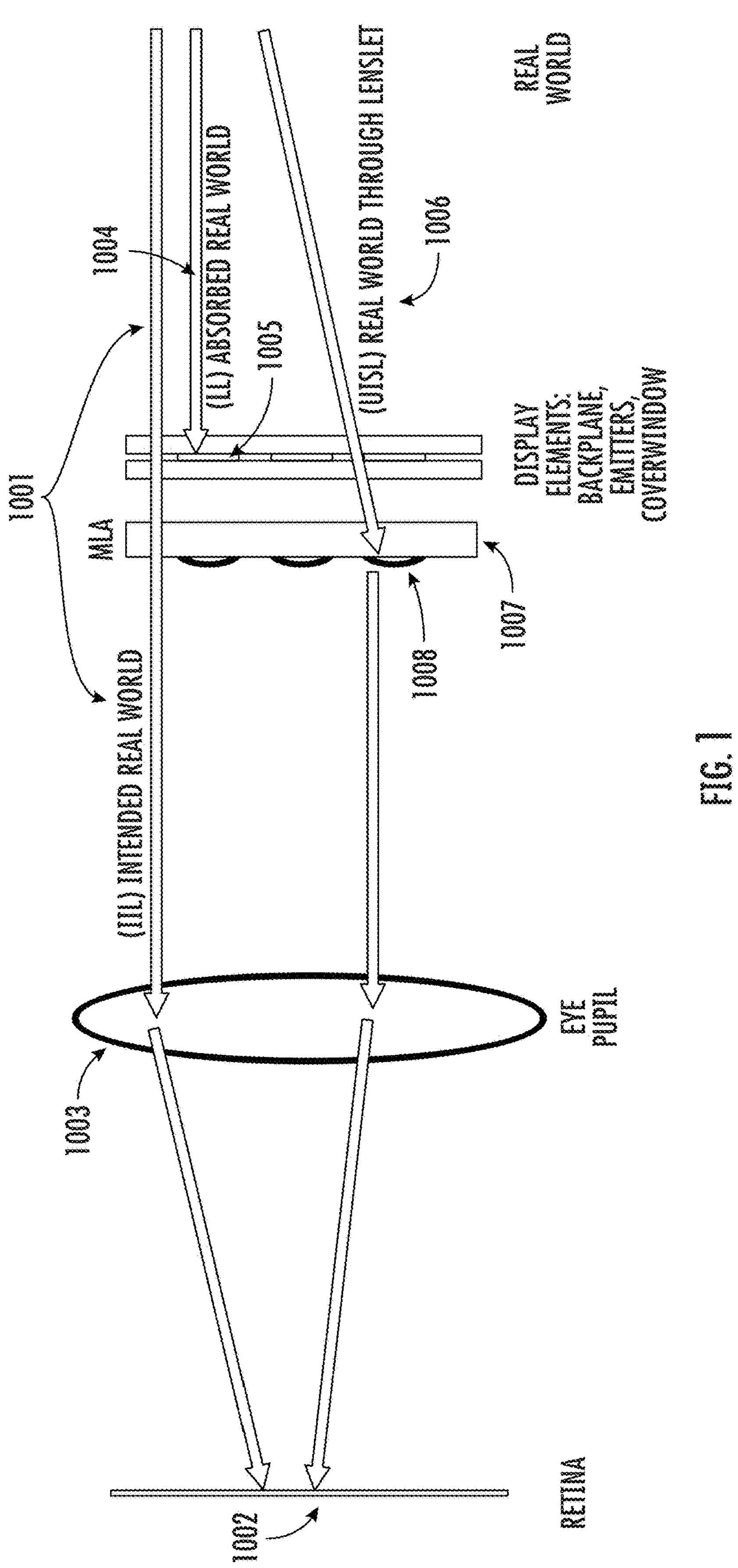
FIG. 1 is a schematic that shows an intended path for real world light rays 1001 to image onto the retina 1002, and probable potential sources of stray light and light loss.
Figure 2:
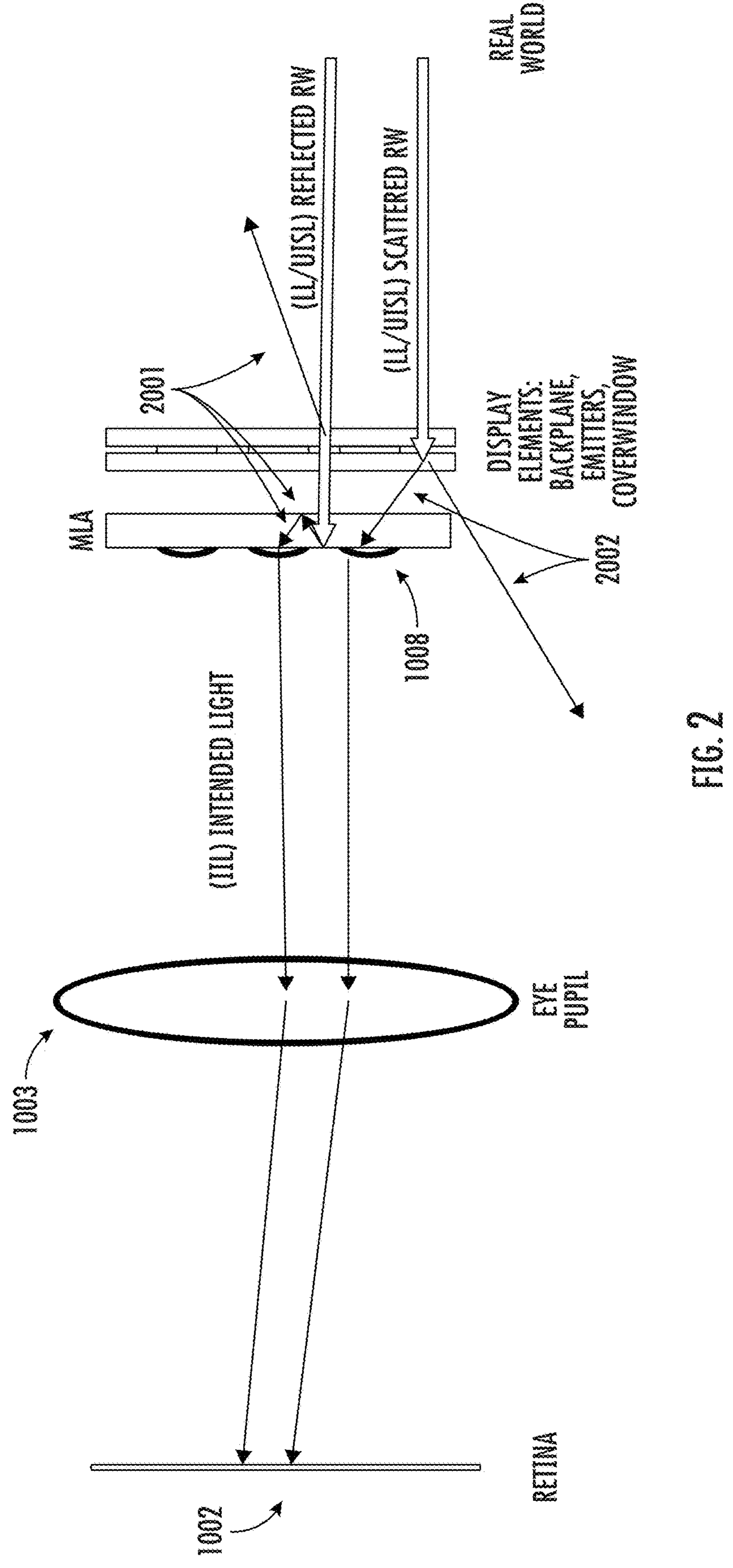
FIG. 2 is a schematic that shows secondary means of producing stray light and lost light originating from the real world, including in addition to the elements of FIG. 1, reflected real world light 2001 and scattered real world light 2002.
Figure 3:
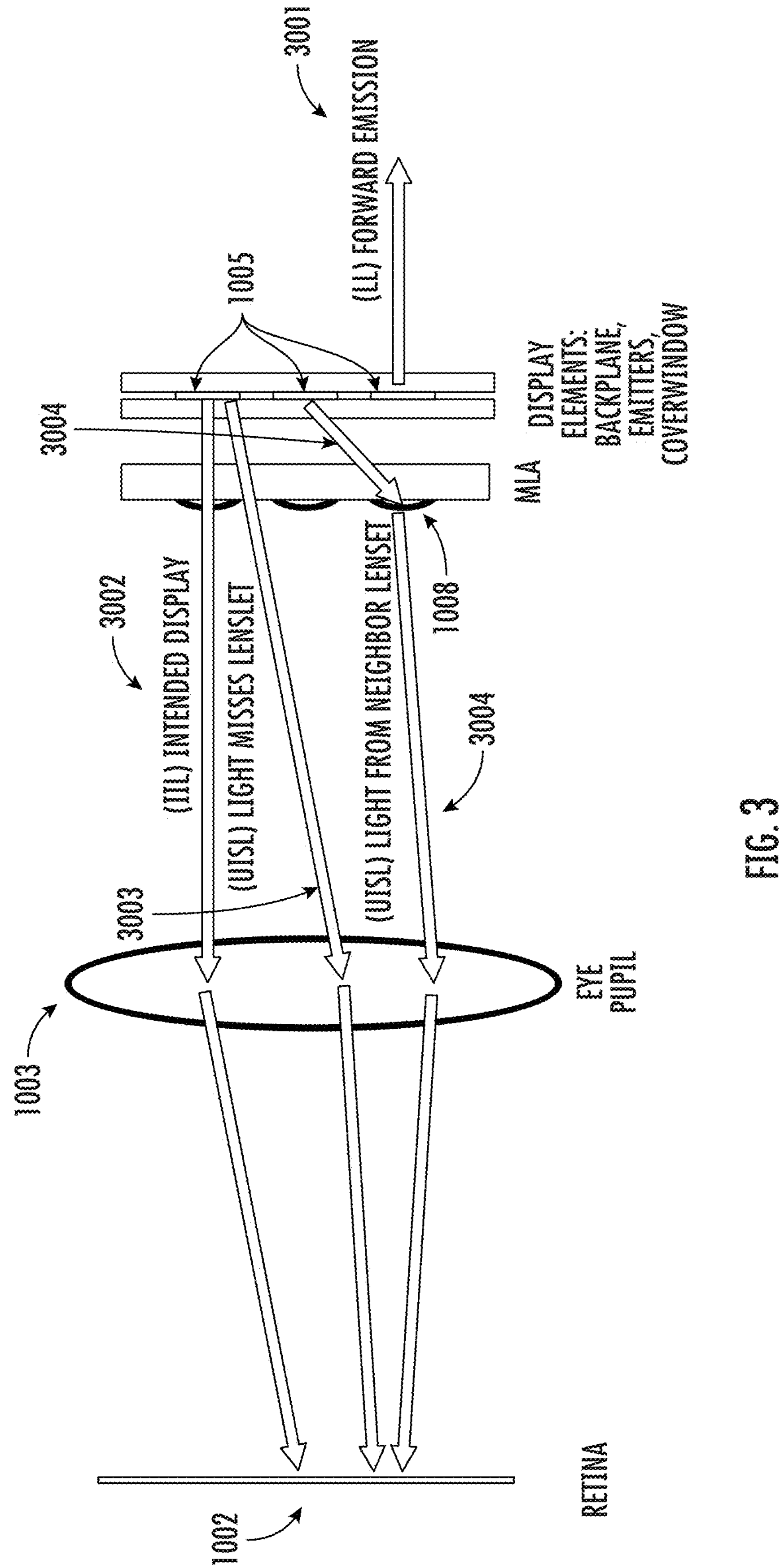
FIG. 3 is a schematic showing the primary path of intended light capture, and potential major means of viewing stray light, plus light loss from the virtual display, including forward emitting light lost 3001 from light emitters 1005, intended display light that passes through an optically coupled lenslet/microlens of the MLA 3002, display pixel or pixel patch light that misses the optically coupled lenslet 3003, and display light from a pixel or pixel patch that passes through a non-optically coupled, neighbor lenslet (another UISL) 3004.
Figure 4:
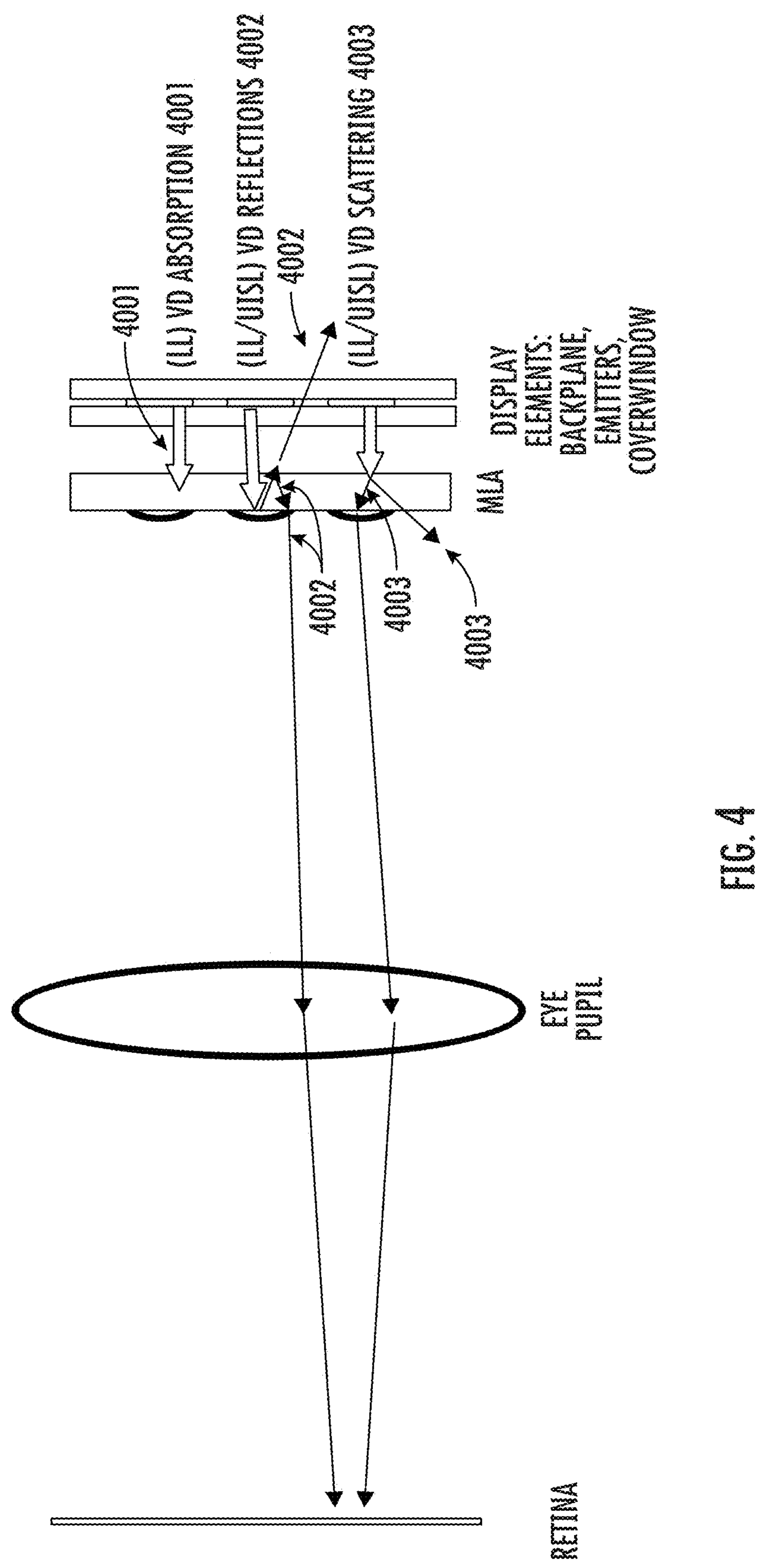
FIG. 4 is a schematic showing secondary means of capturing stray light and lost light produced from the display element, including lost light from virtual display absorption 4001, LL/UISL from virtual display reflections 4002, and LL/UISL from virtual display scattering 4003.
Figure 5:
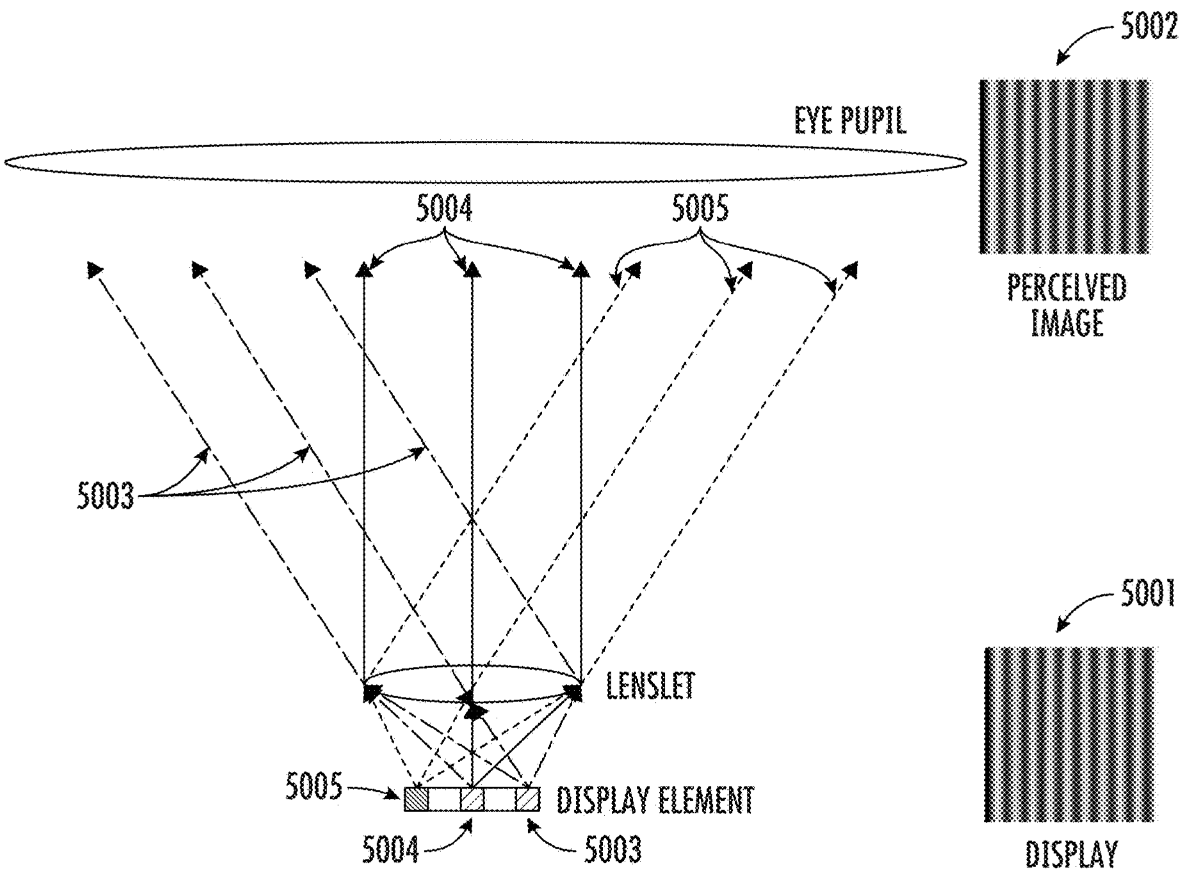
FIG. 5, along with FIG. 6, is a schematic showing an example of how eye pupil size influences the perception of the near eye display image.
Figure 6:
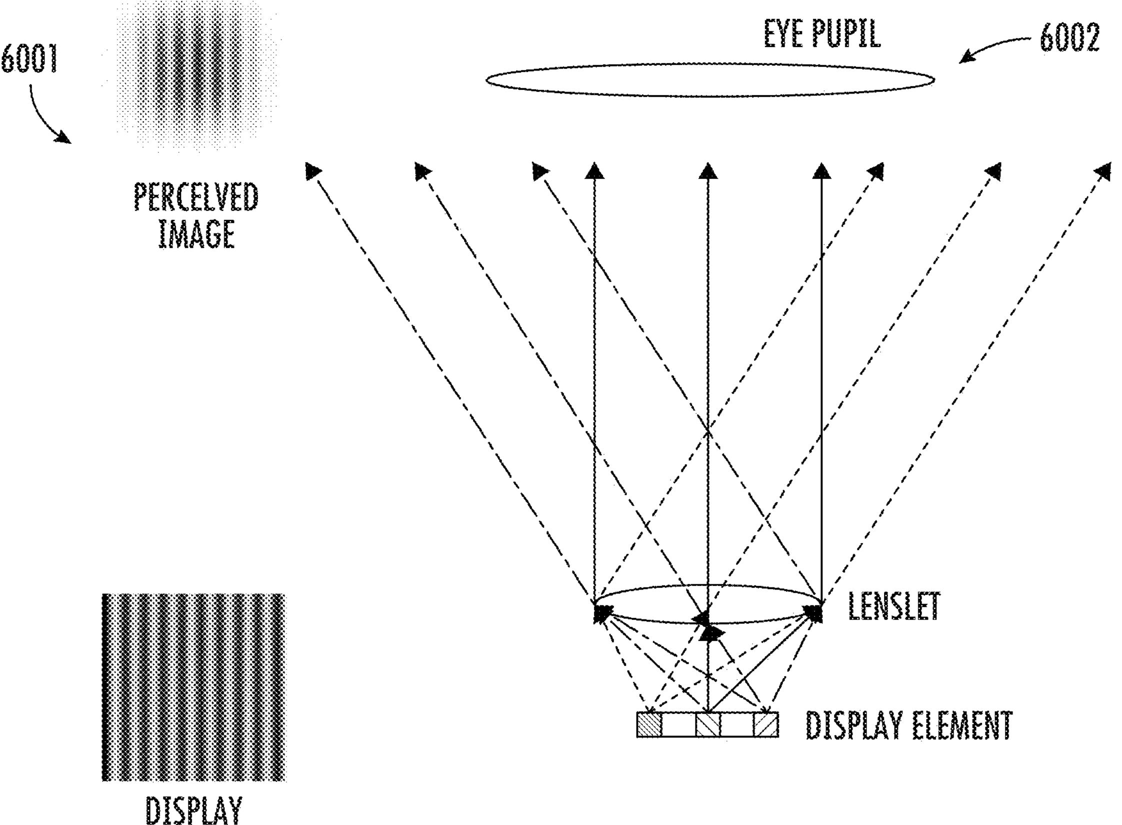
FIG. 6, along with FIG. 5, is a schematic showing an example of how eye pupil size influences the perception of the virtual display image.
Figure 7:
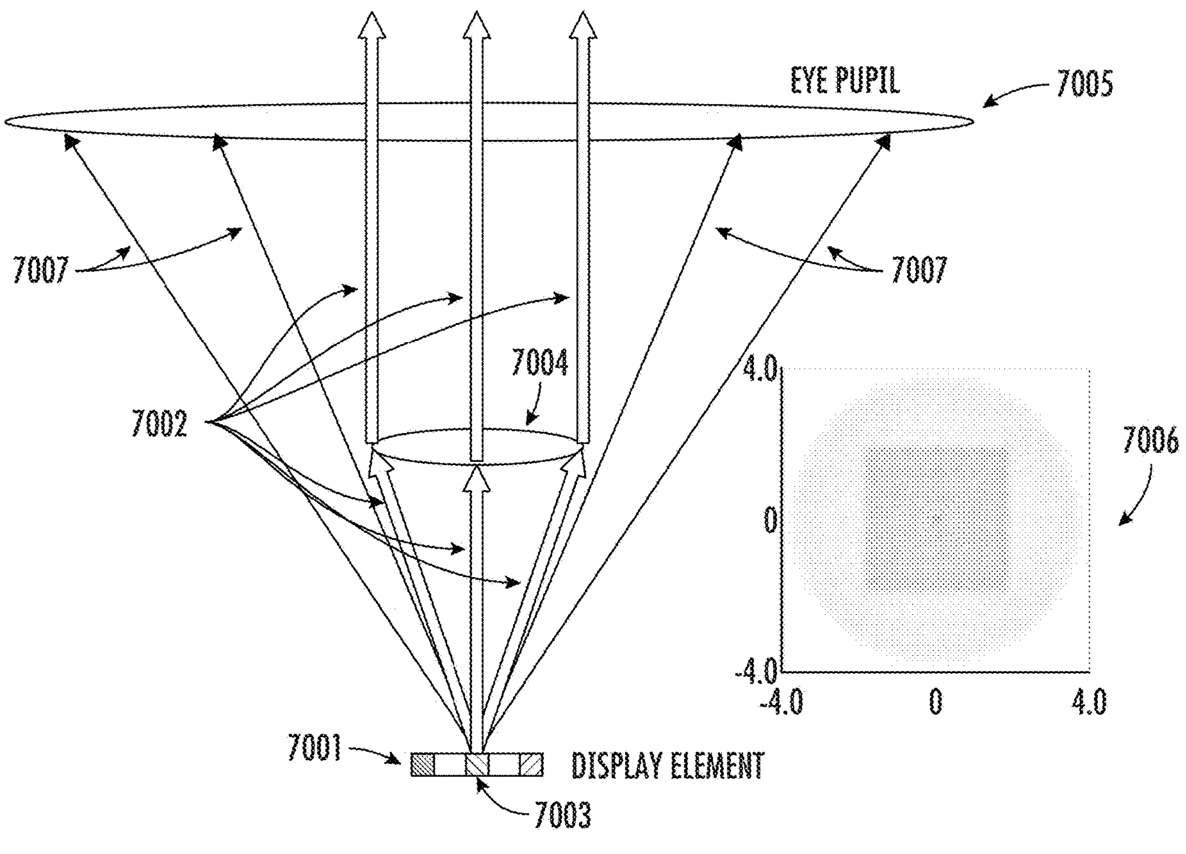
FIG. 7 is a schematic showing an example of a large eye pupil permitting large stray light effects.
Figure 8:
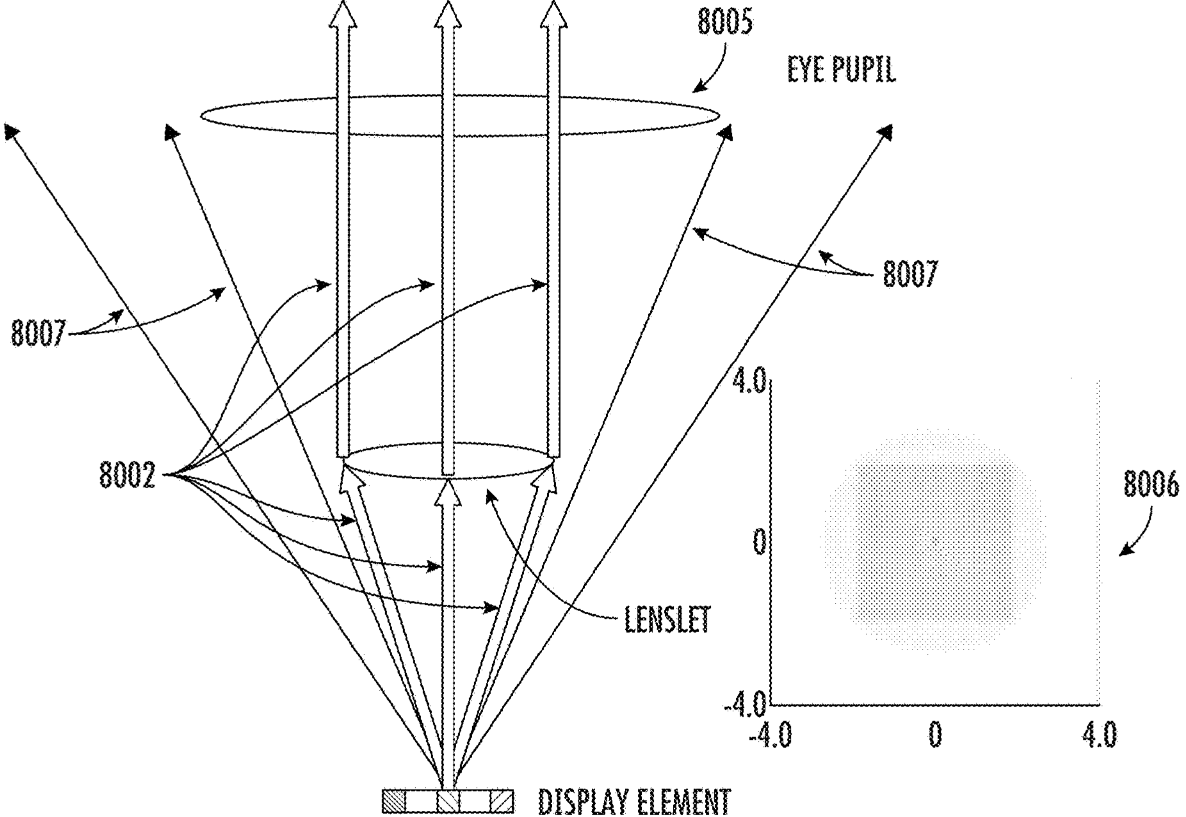
FIG. 8 is a schematic showing an example of a smaller eye pupil size having reduced stray light effects.
Figure 9:
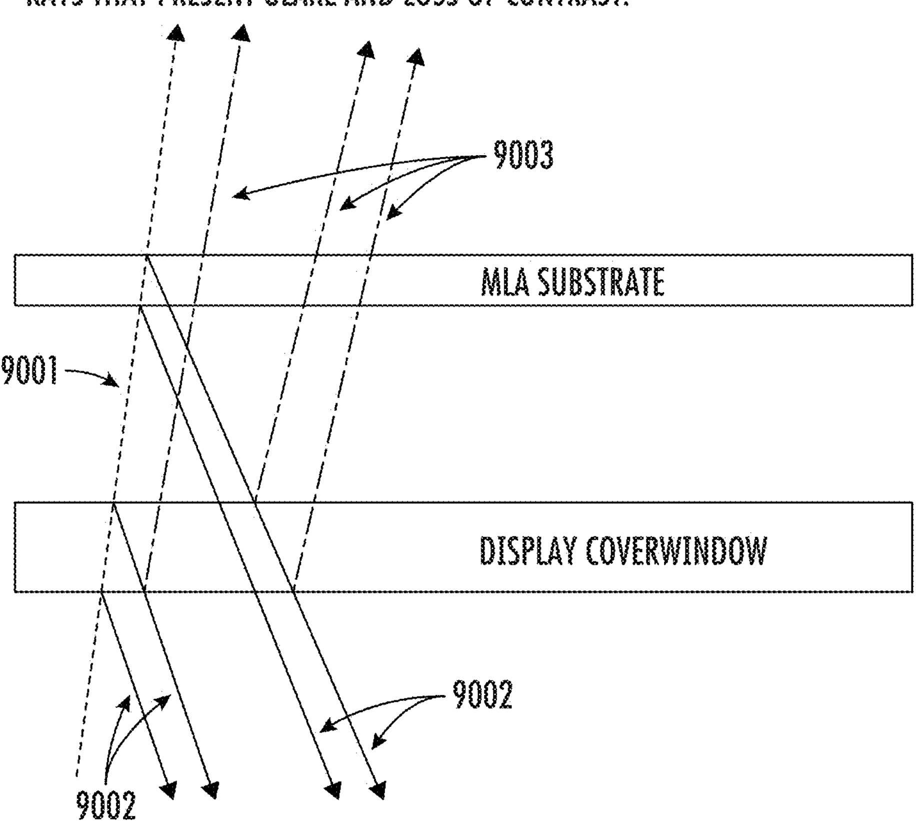
FIG. 9 is a schematic showing an example of reflection effects in an uncoated optical system.

In an embodiment of the present invention, an anti-reflection ("AR") coating(s) can reduce light loss and reduce stray light ghosts and haze in an optical system. In aspects, Fresnel losses (reflection) are ~4% per surface. In embodiments, there are a minimum of four surfaces; two surfaces for the display, and two surfaces for the MLA. In aspects, if no AR coatings are applied, there is the possibility that about 16% (4 surfaces) of the external world light could be lost or would produce ghost images, stray light haze and glare, or further reduce the perceived real world image quality, and about 12% (3 surfaces) of the display light could be lost, produce ghost images, stray light haze and glare or further reduce perceived display image quality. (Note: In aspects, a ghost image is typically a dimmer replication of the image that is laterally or otherwise offset from the desired or intended image.) Reflected/scattered light could also be directed to the eye, especially when the reflected light comes from high intensity sources, such as sun beams and lighting. According to the present invention, AR coatings can enhance the TOM module by improving transmission and reducing glare from intense sources. FIG. 9, for example, shows uncoated glass interfaces. The red arrow is a desired ray 9001. The green rays are reflected rays that represent lost intensity 9002. The blue rays are multiple reflected rays 9003 that could produce ghost images and stray light haze and glare.

Figure 10A:
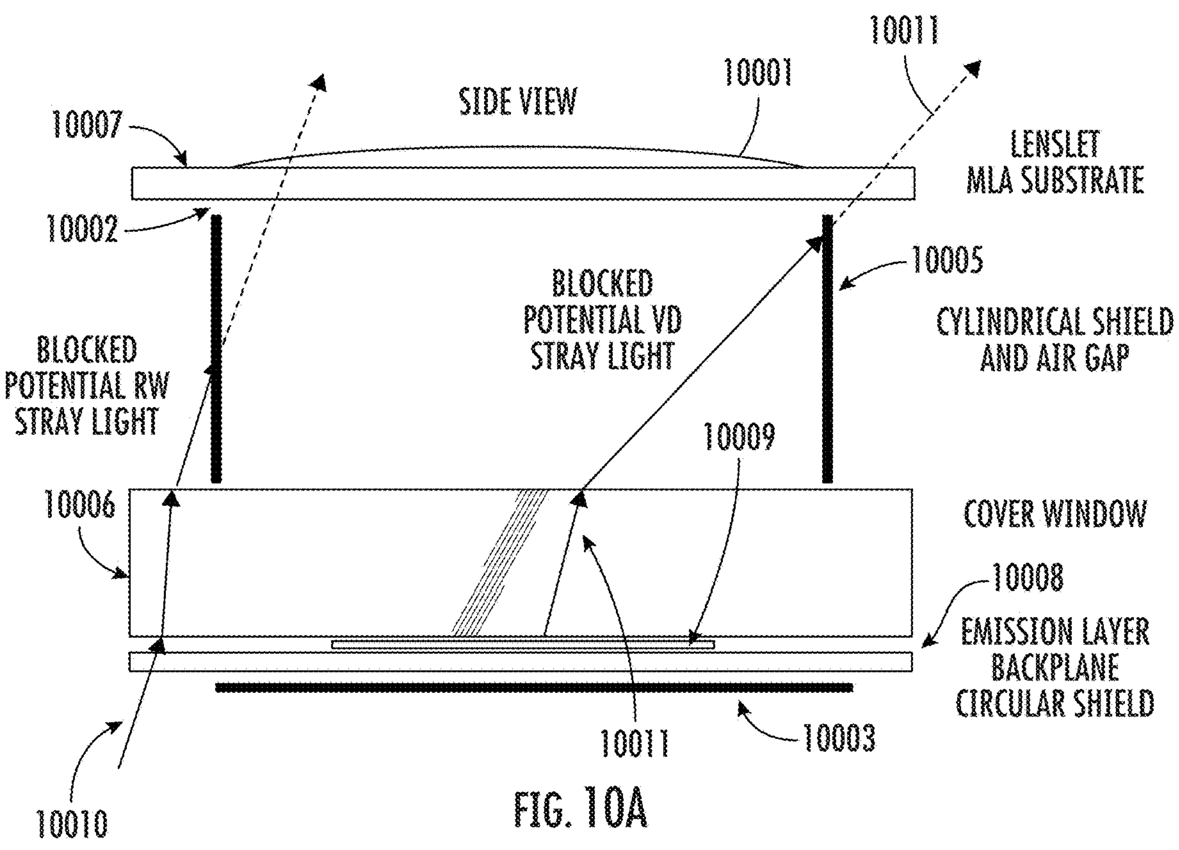
FIG. 10A is a schematic showing an embodiment of a system, device, apparatus, or method according to the current invention to manage, decrease, resolve, mitigate, prevent, or block stray light using hollow and planar shielding structures to separate the RW and VD light channels. Dashed arrow lines show the trajectory of rays that would have potentially produced stray light effects if they had not been blocked.
Figure 10B:
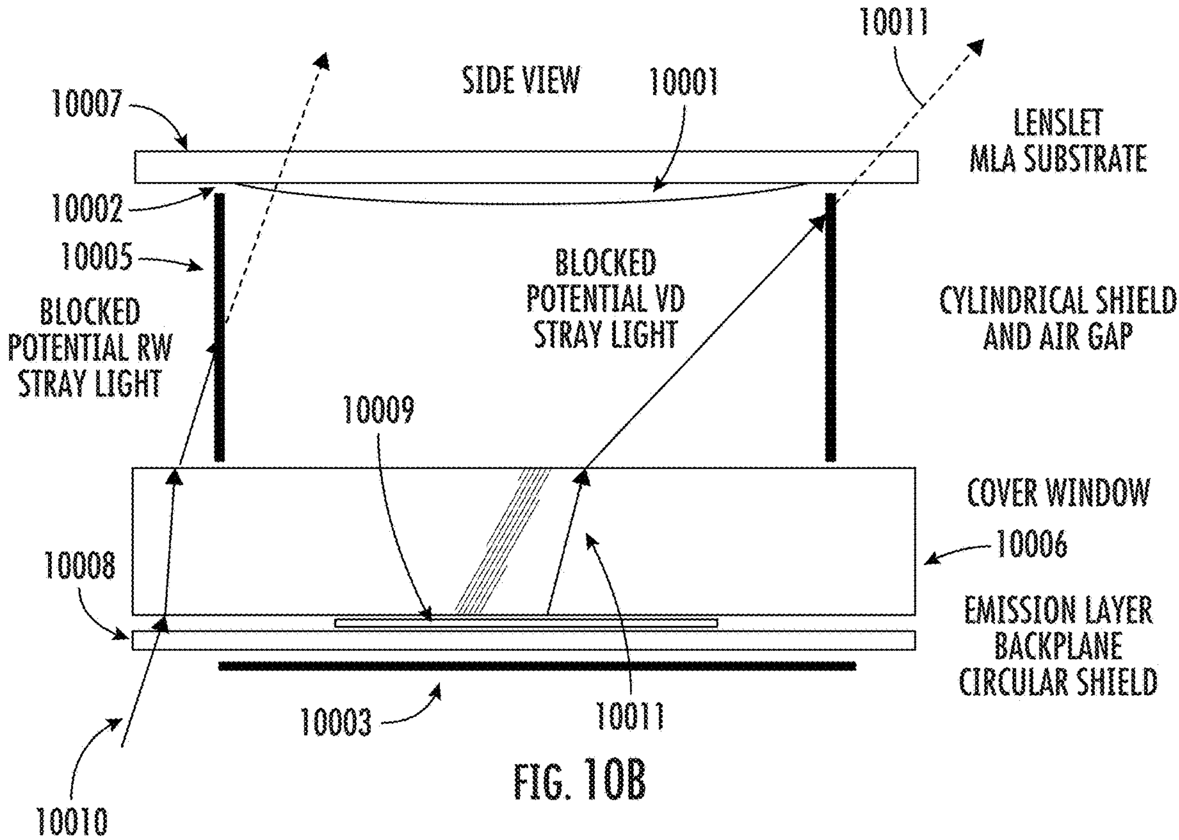
FIG. 10B is like FIG. 10A except that the MLA has been flipped so that the gap between cylindrical shielding and lenslet is reduced.

In a second embodiment according to the present invention, a mechanical (physical), absorbing hollow pipe 10005 can be inserted in a space or spaces between the display cover window 10006 and the MLA substrate 10007. In aspects, the pipe could be circular to match or substantially match the lenslet shape, or rectangular or square to match or substantially match a patch of a plurality of pixels (i.e., "patch," "pixel patch," or "patch of pixels"), or a combination thereof, although other shapes are contemplated. The lenslet 10001 could be positioned on the surface opposite from the display leaving a short transparent MLA substrate gap (see, 10002 in FIG. 10A), or the lenslet could be placed on the surface facing toward the display, providing virtually or substantially no gap (see, 10002 in FIG. 10B). In a preferred embodiment, a shielding plate(s) 10003 below the emitting pixel patch layer can also be included to eliminate the gap between the display and the shield. (See, e.g., FIG. 10A.) In other aspects, the lenslet/microlenslet could also be placed on the pixel side of the MLA substrate to reduce or eliminate the gap where stray light might still be able to enter. FIG. 10 also shows a backplane 10008 and emission layer 10009 (e.g., of pixels or patches of pixels). It also shows real world light that would be blocked and/or absorbed before entering through the lenslet 10010, as well as block and/or absorb NED/VD display light that would miss its optically associated lenslet/microlens or otherwise travel outside a surface area of the associated lenslet/microlens 10011. Examples of optically associated pixel(s) and/or patch(es) of pixels and microlens(es) are shown throughout the figures herein.

The hollow pipes, such as hollow tubular light absorbing pipes, that serve to absorb light between the pixels and/or pixel patches and the MLA are, in aspects, expected to absorb light on both the outer and inner surfaces of the tube. However, light striking a surface at a glancing angle (that is, at an angle almost tangential to the surface) may be more likely to be reflected rather than be absorbed. Therefore, in embodiments, these surface's absorption may be enhanced by textured features, such as ridges, in a manner that leads to increased absorption. For example, grooves and/or ridges (triangular, circular, ovular, square, rectangular, polygonal, hexagonal, or otherwise) may completely or partially cover the hollow pipe surfaces, either on the inside, the outside, or both. The tubular structure itself may comprise or be produced from a light absorbing material. Absorbing coating(s) may also be applied to the surface(s).

Further to this embodiment of a mechanical hollow, tubular, stray light shield or shielding described, an array of mechanical structures may be used to fill space between the display, e.g., xLED or MicroOLED display or other light emitter, and the MLA. In aspects, the array structure(s) separates the volume into a first region that constrains display light to communicate directly with the lenslet but not outside the lenslet, and a second, separate region where external, real world light is transmitted without passing through the lenslet. In aspects, the implementation creates two air spaces separated by the walls of the shielding.

In embodiments, it is not necessary for the two regions to be filled by only air. In aspects, the regions may be filled by any kind of air, any kind of liquid, any kind of solid material, or combinations thereof. Both regions, by way of example only, can be transparent to visible light—and in aspects must be transparent or semi-transparent to visible light—and can be produced using glass or plastic materials, for example, which are transparent or semi-transparent.

The following two embodiments have, in aspects, a first region composed of an air cavity and a second region filled with a transparent material. These configurations may be more suitable for manufacture and assembly with the Transparent Optical Module ("TOM") structure. The first of the two embodiments comprises an array of glass/plastic pillars with absorptive coatings (or textured features) on the outer wall of the pillar. One end of the pillar is matched to, connected to, or adjacent to the lenslet, and the opposite end is matched to, connected to, or adjacent to the display pixel patch or pixel. The cross-sectional shape of the pillars can be cylindrical, rectangular, or otherwise, and may transition from one shape to another along a length of the pillar. The pillars can be attached to a base plate on one end, or each pillar may be individually attached to a display pixel patch, pixel, and/or lenslet. The base plate can be located either closest to the display or closest to the lenslets. In aspects, the array attached to the base plate can be manufactured by directionally etching a rectangularly-shaped transparent plate using a lenslet, pixel, or pixel patch shaped mask to define one or more regions that will be etched not etched. In aspects, the etching process does not pass entirely through the plate, thereby leaving the base. The array can also be produced using molding techniques replicating from a master piece. The base and pillar array can be aligned between lenslet and display to simplify assembly.

In an embodiment, the pillar end of the base and pillar structure is flat, and the lenslets are part of a separate MLA substrate. For this configuration, the MLA, shield structure, and display can be aligned to enable TOM operation. In another embodiment, the lenslet can be formed on or near one end of the pillar, thereby producing a combination MLA shield structure. In this variation, the two pieces—MLA/shielding and display—are aligned for TOM operation.

The pillar shields can also be produced individually and then each pillar can be attached to either the display or MLA substrate.

In aspects, using the pillars can result in removing a portion of the air gap between display and lenslet. This can lead to a reduction in the optical focal length generally proportional to the index of refraction of the material and thus can increase the magnification of the retinal image.

In yet another embodiment of shielding, the material can be removed from the region directly between the lenslet and the display patch or pixel patch. In aspects, the part can be produced from, for example, a rectangular volume using etching, molding, drilling, hole punching, laser ablation, or other techniques to produce holes. The holes can be cylindrical, rectangular, or otherwise, and can transform between shapes from one end of the hole to the other. After the holes have been formed, absorbing material or textured features can be produced on the sidewalls of the holes. In an example, a transparent plate with shield holes can be placed into the region between the display and the MLA, and aligned so that one end of the hole is aligned to the lenslet and the other end is aligned to the display pixel or pixel patch. In aspects, the display, shield volume, and MLA can be fixed to, attached to, or connected to (e.g., glued) each other in order to produce a rigid or semi-rigid structure.

The shield hole configuration can provide an air gap in the region between the lenslet and display. This can allow longer lenslet focal lengths and it can reduce the retinal image magnification of the display patch pattern.

Figure 15A:
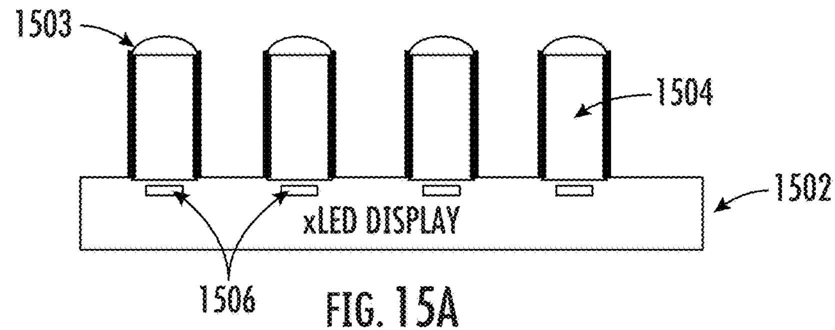
FIG. 15A-C are schematics showing an embodiment of a system, device, apparatus, or method according to the current invention to manage, decrease, resolve, mitigate, prevent, or block stray light using a pillar shield and hollow hole shield structures.
Figure 15B:
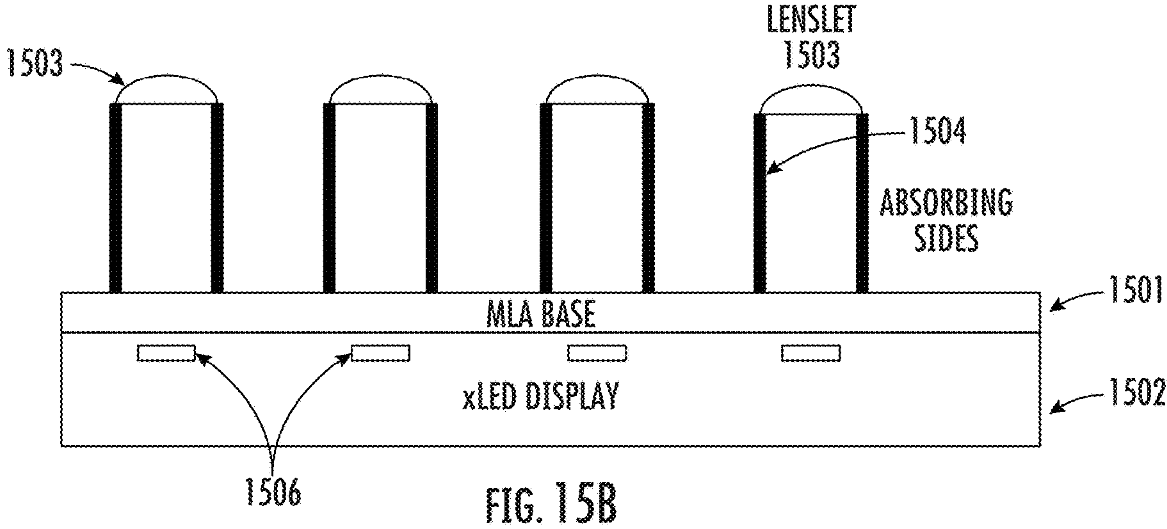
Figure 15C:
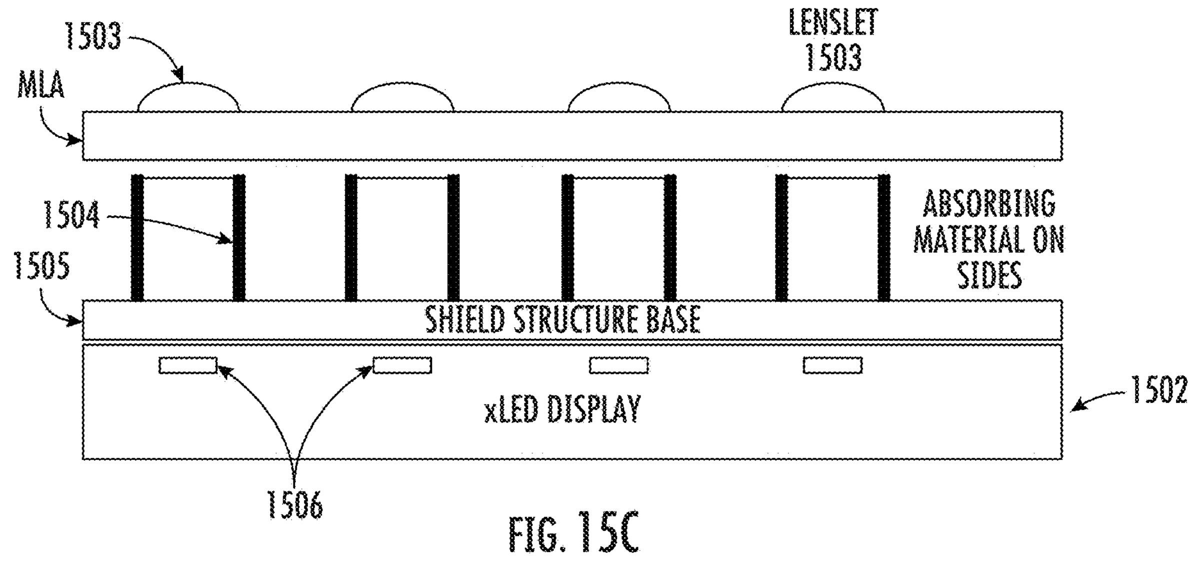

FIGS. 15A-C show several non-limiting variations of the pillar shield and hollow hole shield structures. For example, in FIG. 15B, the MLA substrate 1501, in aspects, removes the air gap between xLED cover 1502 and lenslet 1503. The MLA thickness can be equal to the thickness from cover-window to lenslet. The convex lenslet surface can sit on top of a substrate of glass material (see, e.g., FIG. 15C) where the sides of the column 1504 are optionally coated with absorptive material. An etch may remove material between lenslets. A base layer 1505 may exist to hold the array of cylinders (see, e.g., FIG. 15C), or else each individual lenslet cylinder can be placed on top of each pixel or pixel patch 1506 (see, e.g., FIG. 15A). In aspects, the shielding cylinders can be produced from transparent material with a supporting base, such as a thin supporting base (see, e.g., FIGS. 15B and 15C). In aspects, the shielding cylinders can be produced from transparent material attached directly to display coverwindow.

Figure 16A:
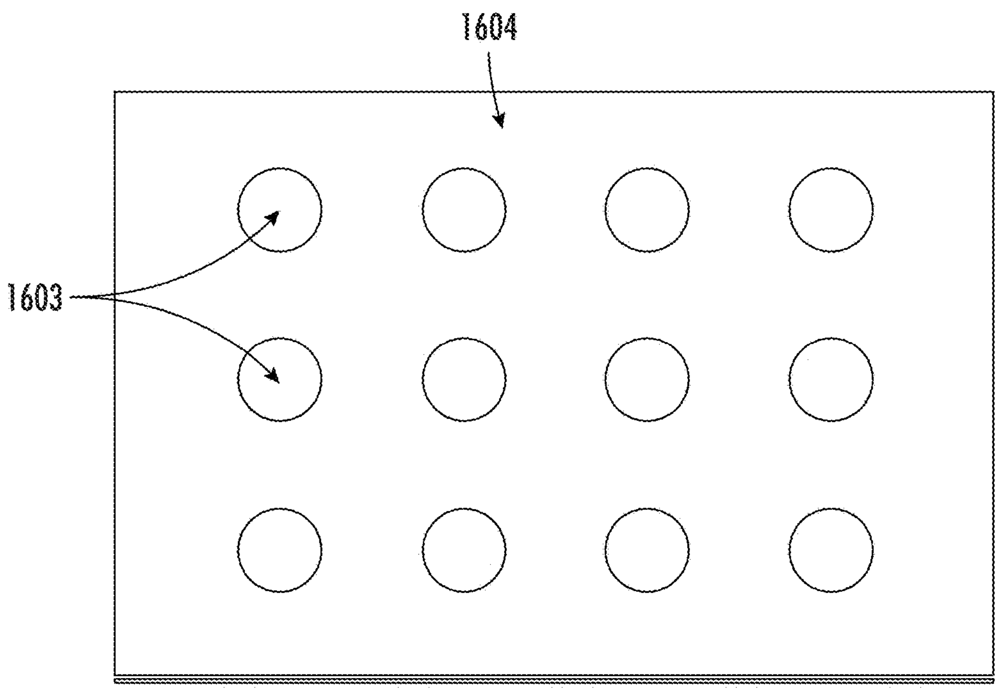
FIG. 16A-B are schematics showing top and side views of an embodiment of a system, device, apparatus, or method according to the current invention to manage, decrease, resolve, mitigate, prevent, or block stray light using transparent material comprised of a plurality of holes formed partially or completely through such material.
Figure 16B:
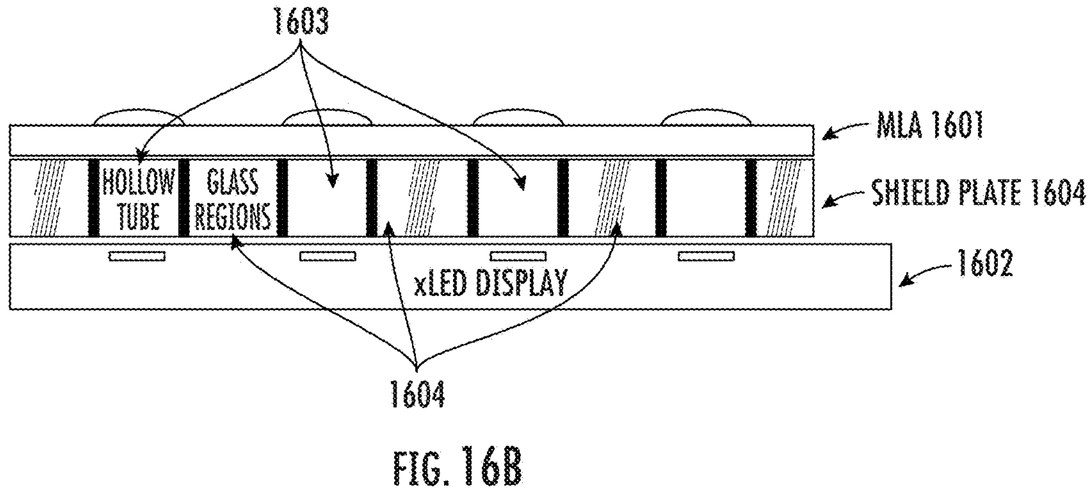

FIG. 16A-B show an embodiment wherein transparent material 1604 (e.g., rectangular or square volume) is placed between the MLA 1601 and the xLED display 1602. The transparent material can be comprised of a plurality of holes 1603 drilled through it, in aspects, from the top surface to the bottom surface. FIG. 16A shows a top view of the shielding plate 1604. FIG. 16B shows a side view of the shielding plate 1604. The holes 1603 can be cylindrical or rectangular and may have a uniform diameter or have a taper. Shapes, such as hole shape, can also include ovular, round, cylindrical, square, rectangular, triangular, polygonal, or hexagonal, and others are also contemplated. The holes closest to the MLA can have a size and shape close to (e.g., matching) the shape and size of the lenslet, such as the same shape/size or about the same shape/size. The holes closest to the display can have a shape and size close to (e.g., matching) the display pixel patch or pixel, such as the same shape/size or about the same shape/size. The interior of the hole can be coated with absorbing material (or textured features) such that the display light is constrained within the hole and real world light does not enter the hole. The holes can be produced by etching, drilling, molding, hole punching, laser ablation, or by other means described herein. Etching, in aspects, uses chemical processing to remove material anisotropically, guided by a surface mask. Molded shields use molding techniques to produce the plate with an array of holes. Laser ablation or inscribing uses a directed laser beam focused to a point to evaporate and remove material at the focus point. The ablation begins on one surface and step-by-step removes material until completing the hole on the opposite surface, in examples. Drilling or hole punching could be used to create holes, apertures, tubes, or other hollow structures as described herein. These could be produced mechanically, as in a drill bit or metal punch, or using laser drilling. Micro-drilling methods, such as those used in the semiconductor industry for example, where holes less than, e.g., 1 mm are needed, could be used in aspects. Other techniques can include micro-milling and micro-EDM. The side wall of the holes can be textured to have ridges or other features that improve absorption.

In a fourth embodiment according to the present invention, annular lenslet aperture shields are used. In aspects, display emission light rays that miss the lenslet and pass through the area immediately surrounding the lenslet (e.g., travel outside a surface area of the lenslet) become stray light that creates a haze or halo around the retinal image. The objective is therefore to partially, mostly, or completely eliminate this light from reaching the eye. Most of the stray light passes through the area surrounding the lenslet, especially the area closest to the lenslet. Therefore, an annular shield with the lenslet inside the inner diameter can eliminate a substantial amount of this light. The eye pupil diameter can have an influence on the size of this area, where larger eye pupil diameters lead to more stray light. An advantage of the shield is stray light reduction.

Figure 11:
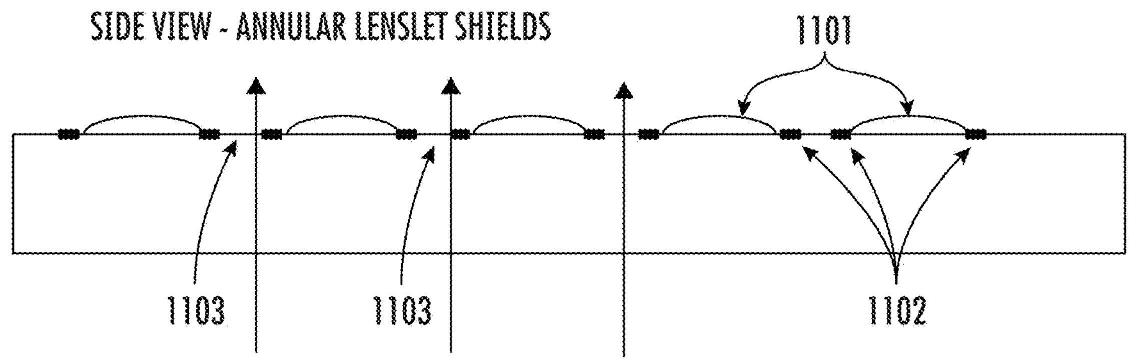
FIG. 11 is a schematic showing the side and top view of an embodiment of a system, device, apparatus, or method according to the current invention to manage, decrease, resolve, mitigate, prevent, or block stray light. The embodiment uses planar annular shields surrounding the lenslet.
Figure 11:
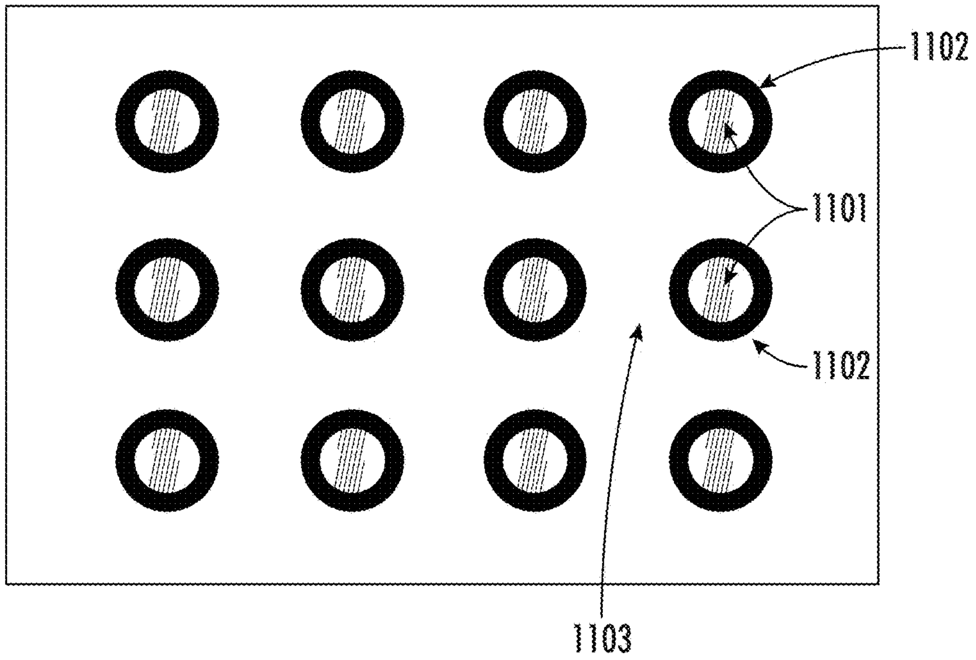

By way of example, FIG. 11 shows blue circles that are lenslets 1101; black annular regions that are the absorber region 1102; and clear/white regions allowing for real world transparency 1103. In aspects, a preferred embodiment is used with display pixel patches with diameters/widths smaller than that of the lenslets. The annular light shields surrounding the lenslets could also be combined together with the cylindrical light pipe shields described in the second embodiment (or other embodiments) described herein.

In a fifth embodiment, annular shields may be used that reside on a surface other than the lenslets on the MLA. This technique may be useful in optical systems composed of more than one lenslet, prism, or other optically functioning elements per display device. In some ways, this embodiment is similar to the technique using annular shielding and the two techniques can be combined. In that configuration as described herein, the annular shield surrounds the lenslet on the same surface without a gap between lenslet and shield. However, in regards to another embodiment, the annular shields can be placed on a different surface from the lenslet. Examples of places where the annular shields can be placed include, but are not limited to, the opposite surface of the MLA, or on a separate substrate. The location, in aspects, could be either closer or farther from the display relative to the lens. (See, e.g., FIGS. 12A-12C.)

Figure 12A:
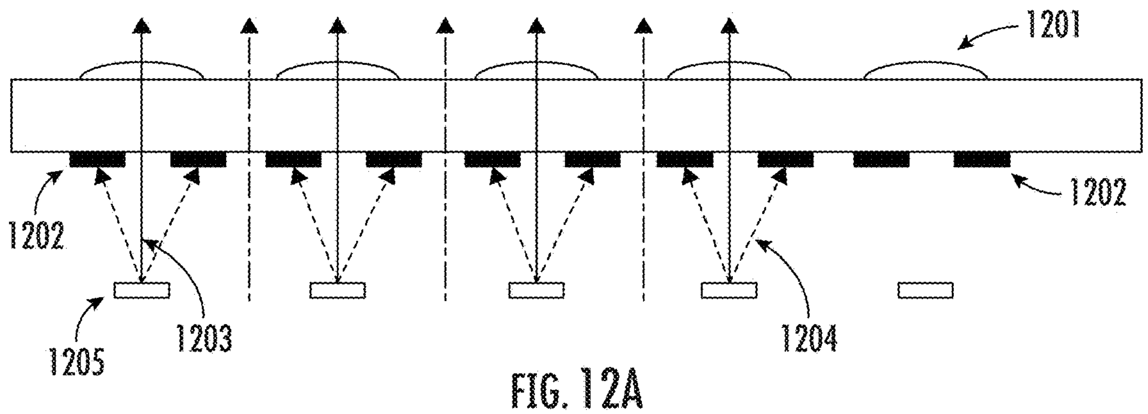
FIGS. 12A-12C are schematics showing embodiments of a system, device, apparatus, or method according to the current invention to manage, decrease, resolve, mitigate, prevent, or block stray light. The stray light control features are annular shields that are placed on surfaces other than the primary lenslet surface.
Figure 12B:
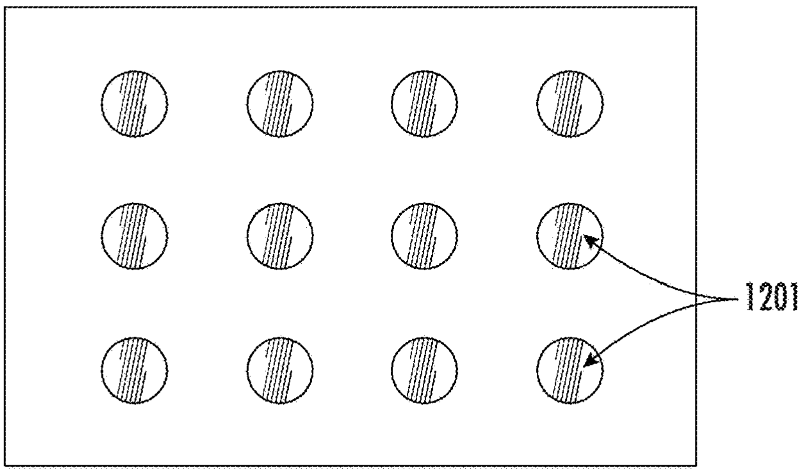
Figure 12C:
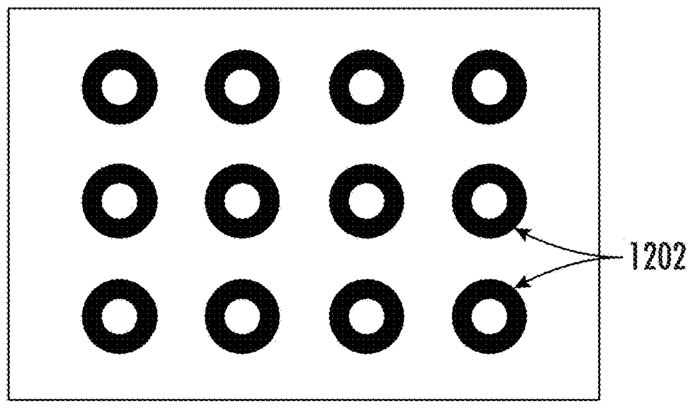

In some embodiments, this method can work better when the display element (e.g., pixel or pixel patch 1205) is generally smaller than the lenslet diameter. In aspects, the hole in the annular shield can be smaller than the lenslet diameter, if located prior to the lens, and larger if located toward the eye. For example, as shown in FIGS. 12A-12C: green rays are desired display light 1203 from a pixel/pixel patch/light emitter 1205, and red rays are blocked potential stray light ray(s) 1204. In aspects, the annular shields 1202 can be circular, oval, square, or rectangular, and other shapes are contemplated. The shields can also have additional lenslets or optical elements embedded within the hole of the shield. FIG. 12A shows a side view showing lenslets 1201 on an opposite surface of an MLA; in aspects the lenslets 1201 and shields 1202 can be located on a separate substrate or material (see, e.g., FIGS. 12B and 12C showing lenslets 1201 and shields 1202 on separate substrates or materials).

In a sixth embodiment, display emitted stray light comes from display light rays that are not coupled to the eye by the associated lenslet. That is, stray light comes from rays that travel outside the edge (e.g., outer edge) of the optical lenslet. According to the present invention, the light could be coupled to the eye if a larger lens were used; that is, if the lenslet size was larger than the display element, such as, in examples only, much larger or typically much larger than the display element. In embodiments, light rays missing the lenslet centered along the common optical axis of the lenslet and the eye pupil can be emitted at an angle such that they do not enter the eye pupil, such as a large or larger angle.

In some aspects, the architecture presumes a lenslet similar to display size, and lenses in some cases or particular configurations may cause obscuration of real world light. Therefore, in aspects according to the present invention, larger lenslets (smaller F #) can be used when imaging quality can be preserved. In aspects, imaging quality can be preserved by designing aspheric optics rather than spherical optics, or by reducing the size of the display element relative to the lenslet size.

Figure 13:
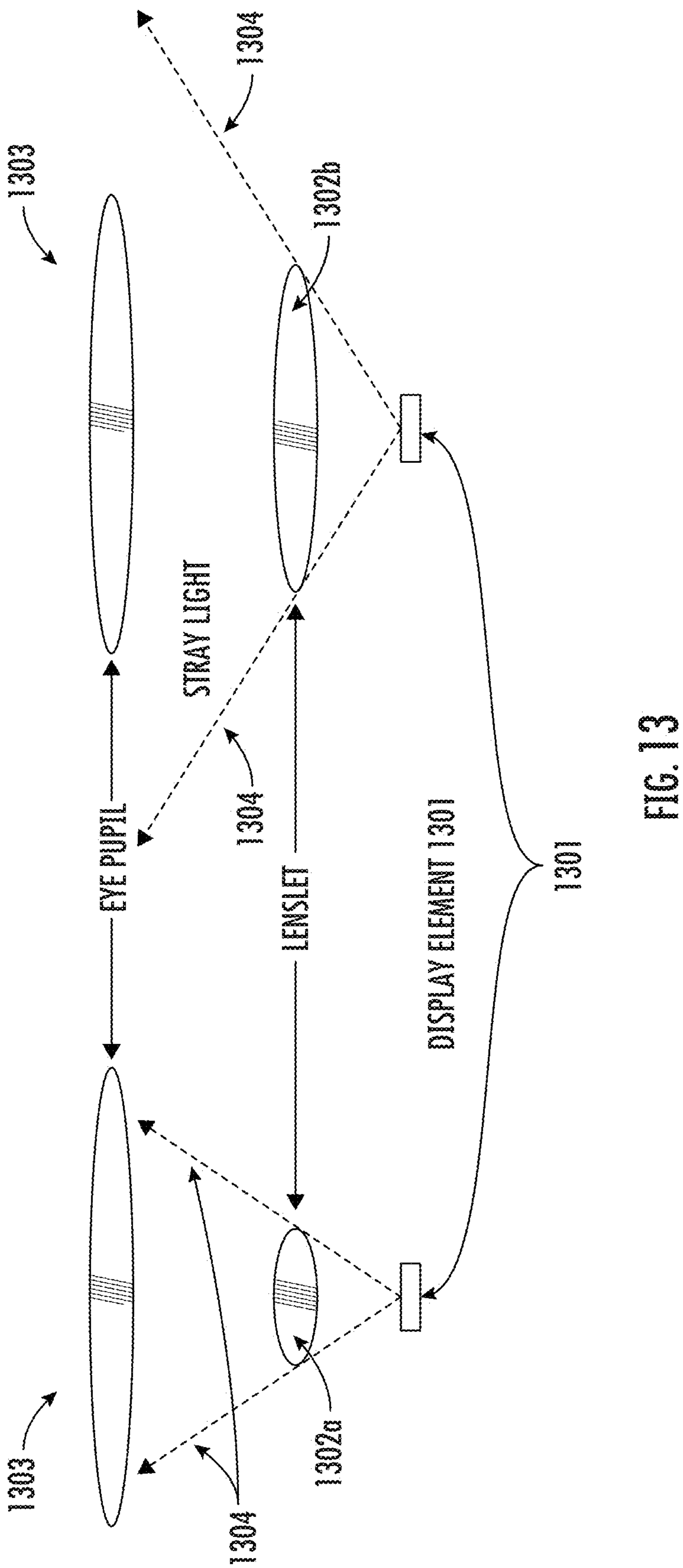
FIG. 13 shows that larger diameter lenslets reduce the angular range for potential stray light rays.

In FIG. 13, the display element 1301, MLA lenslet 1302 and eye pupil 1303 are shown with red arrows 1304 representing potential stray light. The lenslet on the right 1302*b* of FIG. 13 has a larger size relative to that shown on the left 1302*a* of FIG. 13, so the probability of stray light entering the eye pupil is reduced, and in cases significantly reduced. (Dimensions in FIG. 13, like in other Figures herein, are not necessarily to scale.)

It is possible that light emitted from the display will be directed both toward the lenslet and outward toward the real world. The emitter can be OLED, microLED, or other light emitting material. Real world directed light is potentially a problem since others may be able to view display information, or detect the presence of the display from front emitted light; accordingly, the RW emitted light should be shielded.

Figure 14:
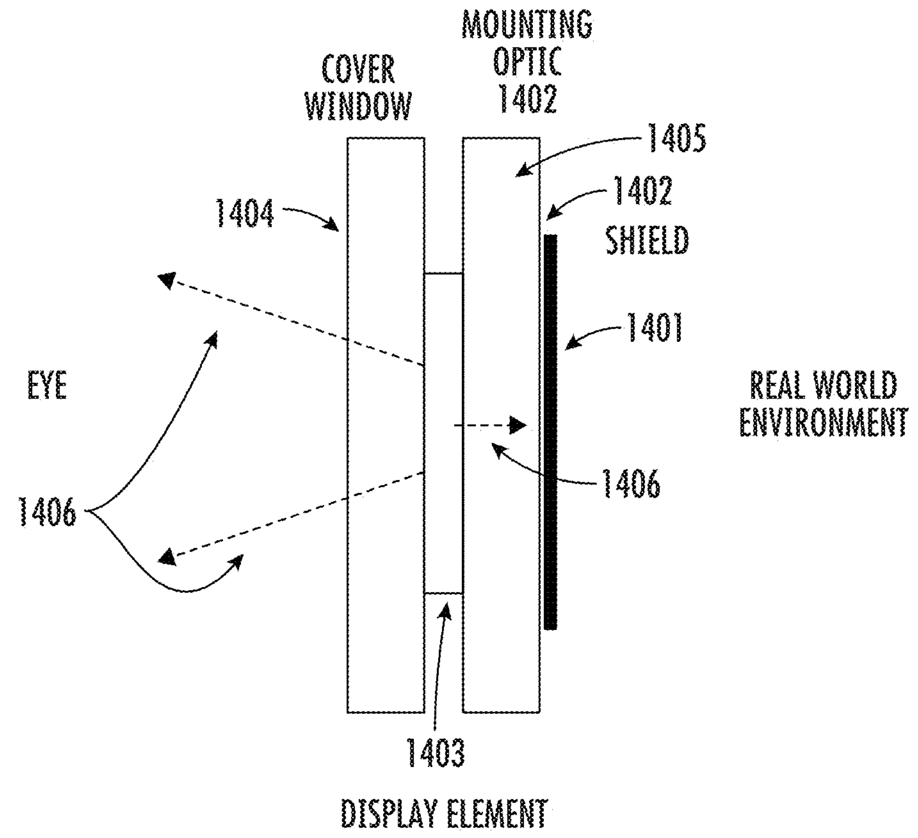
FIG. 14 is a schematic showing an embodiment of a system, device, apparatus, or method according to the current invention to manage, decrease, resolve, mitigate, prevent, or block stray light using a shield to block emission directed or scattered toward the real world.

In a seventh embodiment of the current invention, a direct mechanism for shielding this light is to put or include absorbing material 1401 on the outer display surface/mounting optic 1402 having generally or substantially the same lateral dimensions as the display element 1403 (see, e.g., FIG. 14). The display may or may not have a transparent cover window 1404 toward the eye or a transparent mounting optical plate 1405 toward the external world. The lines 1406 indicate light emitted from the display element 1403.

Embodiments of the invention also include a computer readable medium comprising one or more computer files containing applications, frameworks, libraries, and such, comprising a set of computer-executable instructions for performing one or more of the calculations, steps, processes and operations described and/or depicted herein. In exemplary embodiments, the files may be stored contiguously or non-contiguously on the computer-readable and/or device-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), memory card, and RAM. In exemplary embodiments, the computer readable medium has a set of instructions stored thereon which, when executed by a processor, cause the processor to perform tasks, based on data stored in the electronic database on the computer or cloud, or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers, in personal communication device and/or devices, or be stored in cloud computer. A skilled artisan will further appreciate, in light of this disclosure, how the invention can be implemented, in addition to software, using hardware or firmware. As such, as used herein, the operations of the invention can be implemented in a system comprising a combination of software, hardware, and/or firmware.

Embodiments of this disclosure include one or more computers or devices loaded with a set of the computer-executable instructions described herein. The computers or devices may be a general purpose computer, a special-purpose computer, personal communication device, mobile device, head mounted display, augmented reality glasses or other programmable data processing apparatus to produce a particular machine, such that the one or more computers or devices are instructed and configured to carry out the calculations, sensor data collecting and processing, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (e.g., processor or System on Chip ("SOC")) and a form of computer-readable memory which may include random-access memory ("RAM") or read-only memory ("ROM"). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, wearable device (e.g., electronic watch, smart glasses or HMD—Head Mounted Display), or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output user interfaces may include a graphical user interface (GUI), voice command interface, gesture interface, gaze interface, or combinations thereof, which may be used in conjunction with the computer-executable code and electronic databases. The graphical user interface gesture interface, gaze interface, or combinations thereof, may allow a user to perform these tasks through the use of text fields, check boxes, pull-downs, command buttons, voice commands, various gestures gaze as a selection mechanism, and the like. A skilled artisan will appreciate how such user features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

As used herein, the term "about" refers to plus or minus 5 units (e.g., percentage) of the stated value.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

As used herein, the term "substantial" and "substantially" refers to what is easily recognizable to one of ordinary skill in the art.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

The invention claimed is:

1. An optical display apparatus comprising the following components:

a display comprising a transparent backplane or cover-window comprising a plurality of pixels or patches of pixels, wherein spaces between the plurality of pixels or patches of pixels allow for transmission of real world light to reach an eye of a user of the optical display apparatus;

a microlens array comprising a plurality of microlenses;

a plurality of hollow structures located between the display and the microlens array, wherein the plurality of hollow structures are configured to prevent and/or block stray light from reaching the eye of the user of the optical display apparatus;

a plurality of light blocking shielding plates on a side of the plurality of pixels or patches of pixels facing away from the microlens array and towards a real world environment; and a plurality of annular light blocking shields, wherein an annular light blocking shield of the plurality of annular light blocking shields surrounds or encircles a microlens of the plurality of microlenses.

2. The optical display apparatus of claim 1, wherein one or more of the plurality of hollow structures are circular, ovular, square, rectangular, hexagonal, polygonal, or triangular in shape.

3. The optical display apparatus of claim 1, wherein one or more of the plurality of hollow structures match or substantially match a shape of one or more of the plurality of microlenses.

4. The optical display apparatus of claim 1, wherein one or more of the plurality of hollow structures match or substantially match a shape of one or more of the plurality of pixels or patches of pixels.

5. The optical display apparatus of claim 1, wherein one or more of the plurality of microlenses are positioned on a surface opposite from one or more of the plurality of pixels or patches of pixels, or wherein one or more of the plurality of microlenses are positioned on a surface facing toward one or more of the plurality of pixels or patches of pixels.

6. The optical display apparatus of claim 1, wherein light absorbing material and/or textured features are applied to inner and/or outer sidewalls of one or more of the plurality of hollow structures.

7. The optical display apparatus of claim 1, wherein inner and/or outer sidewalls of one or more of the plurality of hollow structures comprise at least one of light absorbing material and textured features.

* * * * *